(12) United States Patent
Ripin et al.

(10) Patent No.: US 8,406,267 B2
(45) Date of Patent: Mar. 26, 2013

(54) GRAZING-INCIDENCE-DISK LASER ELEMENT

(75) Inventors: Daniel J Ripin, Needham, MA (US); Tso Yee Fan, Belmont, MA (US); Anish K Goyal, Cambridge, MA (US); John Hybl, Nahant, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 4 days.

(21) Appl. No.: 12/389,975

(22) Filed: Feb. 20, 2009

(65) Prior Publication Data
US 2010/0215067 A1    Aug. 26, 2010

(51) Int. Cl.
H01S 3/09 (2006.01)
(52) U.S. Cl. .......... 372/69; 372/68; 372/70; 372/71
(58) Field of Classification Search ......... 372/39, 372/68, 69, 70, 71, 72
See application file for complete search history.

(56) References Cited

U.S. PATENT DOCUMENTS

| | | | | |
|---|---|---|---|---|
| 5,315,612 | A * | 5/1994 | Alcock et al. | 372/69 |
| 5,926,494 | A * | 7/1999 | Pepper | 372/70 |
| 6,097,742 | A | 8/2000 | Caprara et al. | |
| 6,167,069 | A * | 12/2000 | Page et al. | 372/34 |
| 6,285,702 | B1 | 9/2001 | Caprara et al. | |
| 6,393,038 | B1 * | 5/2002 | Raymond et al. | 372/22 |
| 7,535,633 | B2 * | 5/2009 | Franjic et al. | 359/344 |
| 2002/0110164 | A1 * | 8/2002 | Vetrovec | 372/36 |
| 2002/0118718 | A1 * | 8/2002 | Honea et al. | 372/71 |
| 2003/0161375 | A1 | 8/2003 | Filgas et al. | |
| 2004/0114657 | A1 * | 6/2004 | Vetrovec | 372/70 |
| 2004/0190582 | A1 * | 9/2004 | Brick et al. | 372/97 |
| 2005/0036531 | A1 * | 2/2005 | Kan et al. | 372/70 |
| 2006/0078031 | A1 * | 4/2006 | Govorkov et al. | 372/69 |
| 2006/0153257 | A1 * | 7/2006 | Franjic et al. | 372/34 |
| 2007/0047611 | A1 * | 3/2007 | Zanzola | 372/72 |

OTHER PUBLICATIONS

Minassian, A. et al., "Ultrahigh-Efficiency TEM00 Diode-Side-Pumped Nd:YVO4 Laser", Applied Physics B 76, 341-343 (2003).
Page, R.H. et al., "1-Watt Composite-Slab Er:YAG Laser", OSA Trends in Optics and Photonics Series, vol. 10, Advanced Solid-State Lasers 1997, pp. 214-216.
Zimer, H, et al., "Grazung-Incidence YVO4—Nd:YVO4 Composite Thin Slab Laser With Low Thermo-Optic Aberrations," Optics Letters, vol. 29, No. 23, pp. 2761-2763 Dec. 1, 2004.

* cited by examiner

Primary Examiner — Yuanda Zhang
(74) Attorney, Agent, or Firm — Lando & Anastasi, LLP

(57) ABSTRACT

A solid-state gain element including a thin doped region in which an optical signal propagates through the thin doped region at a large angle with respect to the normal to the thin doped region, reflects at a boundary of the thin doped region, and passes through the thin doped region again. An optical pump beam propagates through the thin doped region also at a large angle with respect to the normal to the thin doped region. In one example, the gain element and source of the pump beam are configured such that there is total internal reflection of the pump beam at the boundary of the thin doped region for a second pumping pass through the thin doped region. In another example, an elliptically symmetric laser beam is used to create a circularly symmetric gain region in the thin doped region.

21 Claims, 7 Drawing Sheets

GRAZING-INCIDENCE-DISK LASER ELEMENT

FEDERALLY SPONSORED RESEARCH

This invention was made with government support under Grant No. F19628-00-C-0002 awarded by the USAF. The government has certain rights in this invention.

BACKGROUND

1. Field of Invention

The present invention relates generally to the field of solid-state lasers and, more particularly, to geometries for diode-pumped solid-state lasers.

2. Discussion of Related Art

Solid-state lasers are limited in power scalability with good beam quality by thermo-optics effects. A geometry that exhibits relatively small thermo-optics effects is the grazing-incidence slab (also referred to as the grazing-incidence-disk). In these slabs, the optical gain is confined to a relatively thin region, typically less than about 2 millimeters (mm) thick. This thin region is referred to as the gain region. As shown in FIG. 1, a laser beam (optical signal) 102 is incident upon a thin region (gain region) 104 at a near-grazing incidence (a few degrees out of plane of the gain region 104), passes through the gain region, reflects at an optical surface 106 that bounds one side of the gain region, and then passes through the gain region again. The gain region 104 is pumped with diode radiation 108 directed at nominally normal incidence (i.e., at about 90 degrees or perpendicularly) to the plane of the gain region.

This implementation has relatively small thermal-optic effects because heat dissipated in the gain region 104 has only a short path to a heat sink (due to the thinness of the region), which limits the temperature rise. In FIG. 1, heat flow from the gain region 104 to the heat sink (not shown) is illustrated by arrows 110. In addition, since the whole optical signal (beam) 102 passes through the gain region 104, the thermal gradient is sampled equally by all parts of the optical signal, to the first order, thereby reducing thermo-optic effects. The dimension of the gain region 104 is controlled by either the optical absorption depth at the wavelength of the pump radiation 108 (pump wavelength) or the use of a gain element with a thin doped region. In either case, a high absorption coefficient at the pump wavelength is desired to maximize efficiency and allow the gain region 104 to be made as thin as possible.

SUMMARY OF THE INVENTION

The requirement of a high absorption coefficient at the pump wavelength has restricted the use of the grazing-incidence slab geometry with maximum benefit to those solid-state gain materials that have high absorption coefficients. Materials may have high absorption coefficients either because they have a high absorption cross-section (e.g., Nd:YVO$_4$), or because they can be doped highly (e.g., Er:YAG operating at a wavelength of about 2.9 micrometers). However, there are many other gain materials that do not have sufficiently high absorption coefficients to be effective in the conventional geometry illustrated in FIG. 1, such as, for example, Nd:YAG. Accordingly, aspects and embodiments are directed to a solid-state gain element geometry that can be used with a wide variety of solid-state laser materials and which may allow good power scalability with low-thermo-optics effects.

According to one embodiment, a solid-state gain element includes a thin doped region having a thickness of about 0.1 mm to about 2 mm. An optical signal (also referred to as a laser beam) propagates through the thin doped region at a large angle, for example, an angle of greater than about 45 degrees, for example, in a range of about 45-89 degrees with respect to the normal to the thin doped region and reflects at a boundary of the thin doped region such that it passes through the thin doped region again. A pump beam propagates through the thin doped region also at a large angle, for example, an angle of greater than about 45 degrees, for example, in a range of about 45-89 degrees with respect to the normal to the thin doped region. In one example, the gain element and source of the pump beam are configured such that there is total internal reflection of the pump beam at the boundary of the thin doped region for a second pumping pass through the thin doped region. In another example, an elliptically symmetric laser beam is used to create a circularly symmetric gain region in the thin doped region to reduce amplified spontaneous emission, as discussed further below.

According to another embodiment, an optical system comprises a heatsink, a thin doped region disposed on a first surface of the heatsink, an undoped cap coupled to the thin doped region, a pump radiation source configured to generate an optical pump beam incident on the thin doped region at a first non-zero angle relative to the normal to the thin doped region, and a laser source configured to generate a laser beam incident on the thin doped region at a second non-zero angle relative to the normal to the thin doped region.

In one example of the optical system, the first non-zero angle is at least approximately 45 degrees relative to the normal to the thin doped region. In another example, the first non-zero angle is in a range of approximately 45 to 89 degrees relative to the normal to the thin doped region. In one example, the second non-zero angle is at least approximately 45 degrees relative to the normal to the thin doped region. In another example, the second non-zero angle is in a range of about 45 degrees to about 89 degrees relative to the normal to the thin doped region. The first non-zero angle may be selected to achieve total internal reflection of the optical pump beam at a boundary of the thin doped region. In one example, the laser source is configured to generate a laser beam having an elliptically symmetric cross-section. The laser source may be further configured to generate the laser beam incident on the thin doped region at the second non-zero angle such that the laser beam is sheared into a beam having a substantially circular cross-section in the thin doped region. The heatsink may comprise, for example, a material with a higher thermal conductivity than the thin doped region. The thin doped region may comprise, for example, one of Nd:YAG and Yb:YAG. In one example, at least one of the thin doped region and the heatsink are configured to refract the laser beam so that the laser beam passes through the thin doped region at a third angle different than the first non-zero angle, and the laser source is configured and arranged relative to the heatsink such that a path of the laser beam outside of the heatsink is substantially parallel to the first surface. In one example, the heatsink, the thin doped region and the undoped cap together form a first gain element, wherein the optical system further comprises a second gain element, and wherein the first and second gain elements are optically coupled in series. The first and second gain elements may be mounted to a common dewar, wherein a path of the laser beam path outside of the first and second gain elements is substantially parallel to the first surface. The heatsink may be operated at cryogenic temperatures.

According to another embodiment, an optical system comprises a laser source configured to generate a laser beam, a pump radiation source configured to generate an optical pump beam, and a first solid-state gain element. The first solid-state gain element includes a heatsink and a thin doped region disposed on a first surface of the heatsink. The laser source is positioned relative to the first solid-state gain element and configured such that the laser beam is incident on the thin doped region at a grazing angle, and the pump radiation source is disposed relative to the first solid-state gain element and configured such that the optical pump beam is incident on the thin doped region at a non-zero angle relative to the normal of the thin doped region. The first solid-state gain element may further comprise an undoped cap coupled to the thin doped region.

In one example, the non-zero angle is at least approximately 45 degrees. In another example, the non-zero angle is in a range of approximately 45 degrees to 89 degrees. In one example, the laser source and the pump radiation source are arranged such that the laser beam and the optical pump beam are substantially co-linear. In one example, the grazing angle is at least approximately 45 degrees relative to the normal to the thin doped region. In another example, the grazing angle is in a range of about 45 degrees to about 89 degrees relative to the normal to the thin doped region. In another example, the non-zero angle is selected to achieve total internal reflection of the optical pump beam at a boundary of the thin doped region. The heatsink may comprise, for example, a material with higher thermal conductivity than the thin doped region. The thin doped region may comprise, for example, one of Nd:YAG and Yb:YAG. In one example, the laser source is configured to generate a laser beam having an elliptically symmetric cross-section. The laser source may be further configured to generate the laser beam incident on the thin doped region at the second non-zero angle such that the laser beam is sheared into a beam having a substantially circular cross-section in the thin doped region. The optical system may further comprise a second solid-state gain element optically coupled in series with the first solid-state gain element. In one example, a path of the laser beam path outside of the first and second gain elements is substantially parallel to the first surface. The solid-state gain element(s) may be operated at cryogenic temperatures.

According to another embodiment, a method of amplifying an optical signal within an optically-pumped solid-state gain medium comprises acts of creating a gain region in the solid-state gain medium by pumping the solid-state gain medium with an optical pump beam incident on at least one surface of the solid-state gain medium at a first non-zero angle relative to the normal to the at least one surface to produce optical gain within the solid-state gain medium, directing the optical signal at the solid-state gain medium at a near-grazing incidence, and passing the optical signal through the gain region to amplify the optical signal.

In one example, the solid-state gain medium has a substantially flat surface, and the act of directing the optical signal at the solid-state gain medium includes generating a laser beam with a laser source, and directing the laser beam at the substantially flat surface of the solid-state gain medium at the near-grazing incidence. In another example, directing the optical signal at the solid-state gain medium includes directing the optical signal to reflect internally from the substantially flat surface at a grazing angle of less than approximately 45 degrees relative to the plane of the substantially flat surface. Creating the gain region may include directing the optical pump beam at the least one surface of the solid-state gain medium at an angle in a range of approximately 45-89 degrees relative to the normal to the at least one surface. In another example, directing the optical signal includes directing the optical signal to at least one surface of the solid-state gain medium substantially co-linearly with the optical pump beam. The method may further comprise using the solid-state gain medium at cryogenic temperatures. In another example, the method further comprises passing the optical signal though a gain region of a second solid-state gain medium optically coupled in series with the solid-state gain medium. In another example of the method, directing the optical signal at the solid-state gain medium includes directing the optical signal substantially parallel with the at least one surface, and refracting the optical signal so that the optical signal is incident on the thin doped region at the near grazing incidence. The method may further comprise directing an optical signal having a substantially elliptical cross-section at the solid-state gain medium, and shearing the optical signal as it passes through the gain region into a signal having a substantially circular cross-section in the gain region.

Still other aspects, embodiments, and advantages of these exemplary aspects and embodiments, are discussed in detail below. Any embodiment disclosed herein may be combined with any other embodiment in any manner consistent with the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Aspects and embodiments are directed to a solid-state gain element geometry that may enable good power scalability with low thermo-optic effects and which can be used with a wide variety of solid-state laser materials. According to one embodiment, a gain element has a grazing-incidence-slab geometry; however, the pump radiation is propagated in a direction different from what is conventionally done. In addition, in one embodiment, by using particular input beam geometries, amplified spontaneous emission can be reduced compared to conventional systems, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, and upper and lower are intended for convenience of description, not to limit the present systems and methods or their components to any one positional or spatial orientation.

Figure 1:
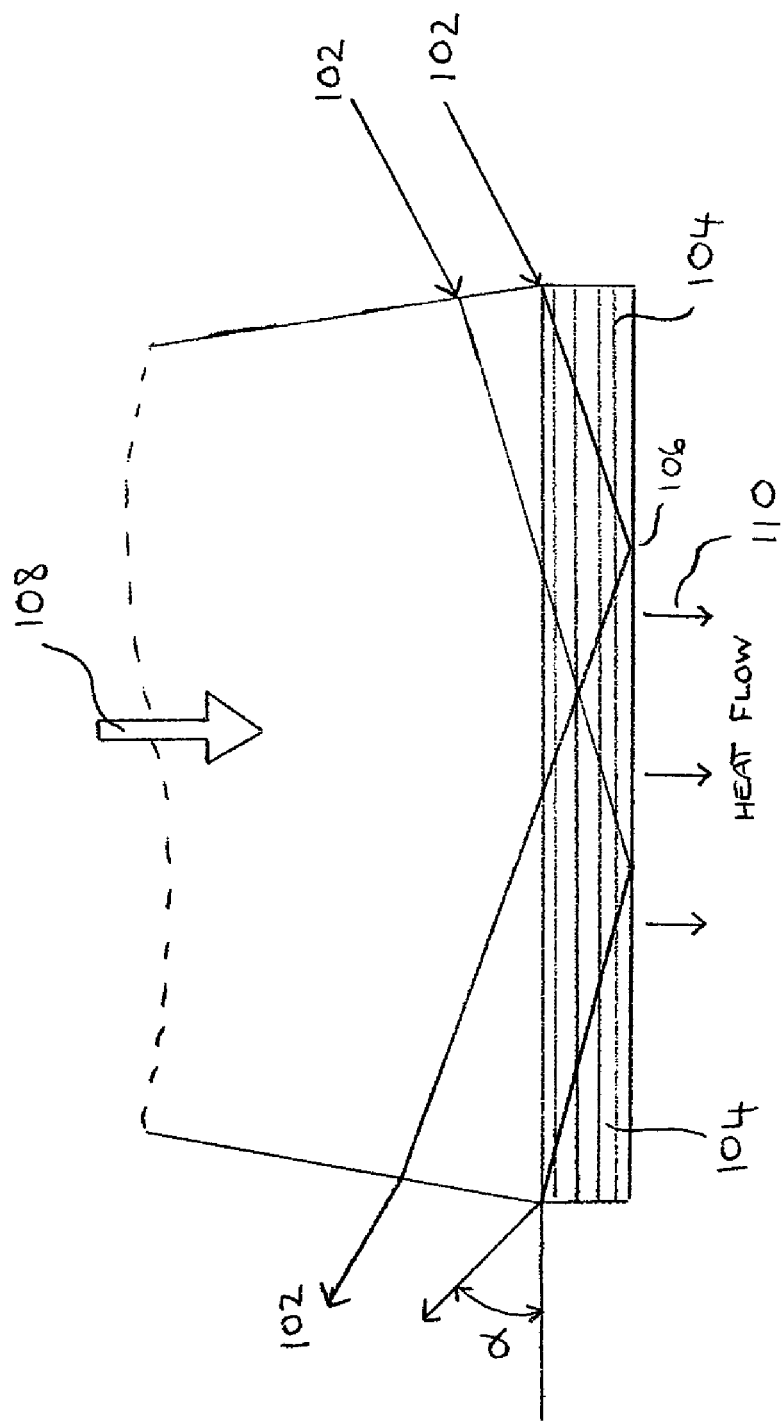
FIG. 1 is a diagram of an example of conventional grazing-incidence slab geometry for a gain element.
Figure 2:
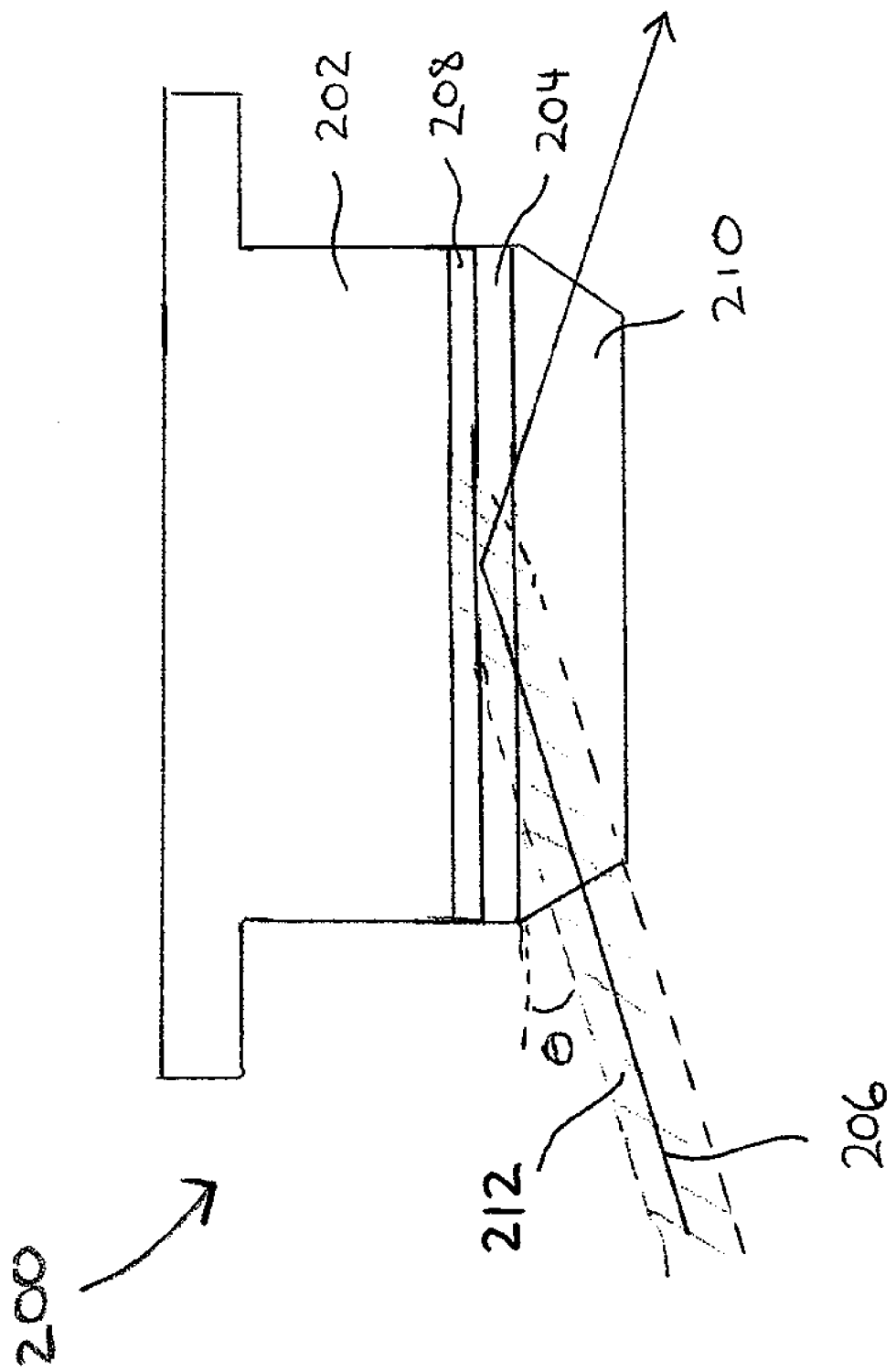
FIG. 2 is a diagram of one example of a gain element having a grazing-incidence slab geometry, according to aspects of the invention.

Referring to FIG. 2, there is illustrated one example of an optical system 200 including a gain element with a grazing-incidence-slab geometry, according to one embodiment. As illustrated in FIG. 2, in one embodiment, the optical system comprises a substrate or heatsink 202 that provides a platform for the gain element. The gain element comprises a thin doped region 204 disposed on the heatsink 202, the thin doped region comprising the gain region, as discussed further below. The gain element further comprises a second region 208 adjacent the thin doped region 204, and an undoped cap 210 coupled to the thin doped region, as discussed further below. An optical signal 206 is directed toward the gain element, is incident on the gain element, passes through the gain region where it is amplified, reflects at an interface that bounds one side of the thin doped region, and then passes through the gain region again for further amplification. The reflection at the interface with the thin doped region 204 is caused by the region 208 having a lower refractive index than the thin doped region. The gain region in the thin doped region 204 is created by pumping the gain element with an optical pump beam 212, as discussed further below.

According to one embodiment, the heatsink 202 acts to dissipate heat from the gain region. Accordingly, some materials that can be used for the heatsink 202 include those with higher thermal conductivity than the thin doped region 204. Some example materials that can be used for the thin doped region include, but are not limited to, Nd:YAG and Yb:YAG. Some example materials that can be used for the lower refractive index region include, but are not limited to, magnesium fluoride ($MgF_2$) and silicon dioxide ($SiO_2$).

As discussed above, according to one embodiment, the gain element includes an undoped cap 210 coupled (e.g., bonded or adhered) to the thin doped region 204. As used herein, the term "undoped" in the context of the undoped cap 210 is intended to mean that the cap does not include any intentional dopant that significantly absorbs (or provides gain) at either the wavelength of the optical signal or at the wavelength of the optical pump beam. The cap 210 may be doped with other dopants, for example, to increase resistance of the cap to radiation damage, but these other dopants do not cause significant absorption or gain at the wavelengths of the optical signal or pump beam. The undoped cap 210 may serve multiple purposes. The undoped cap 210 allows the thin doped region 204 to be very thin, for example, having a thickness in a range of about 0.1 mm to about 2 mm, without the thin doped region being susceptible to breakage or warping. In another example, the undoped cap 210 helps to reduce amplified spontaneous emission effects because fluorescence is not trapped in the gain region. Rather, fluorescence is free to propagate from the thin doped region 204 into the undoped cap 210 because there is essentially no reflection at the interface between the thin doped region and the undoped cap. Amplification of the fluorescence can occur only in the thin doped region. For efficient operation of the gain element, amplification of only the optical signal is desired, and no amplification of the fluorescence. This is because amplification of the fluorescence takes power that could otherwise be used to amplify the optical signal. Accordingly, by allowing the fluorescence a free path through the undoped cap away from the thin doped region, the fluorescence is not trapped in the thin doped region where it could be undesirably amplified, and amplified spontaneous emission is reduced.

It is to be appreciated that in any embodiment the optical signal 206 can be generated by placing the gain element inside an optical resonator and pumping the gain element with the optical pump beam 212. It is further to be appreciated that the use of these gain elements is not limited to laser systems configured as amplifiers, and that the gain elements may be used in a variety of other applications including, for example, in laser oscillators.

Figure 3:
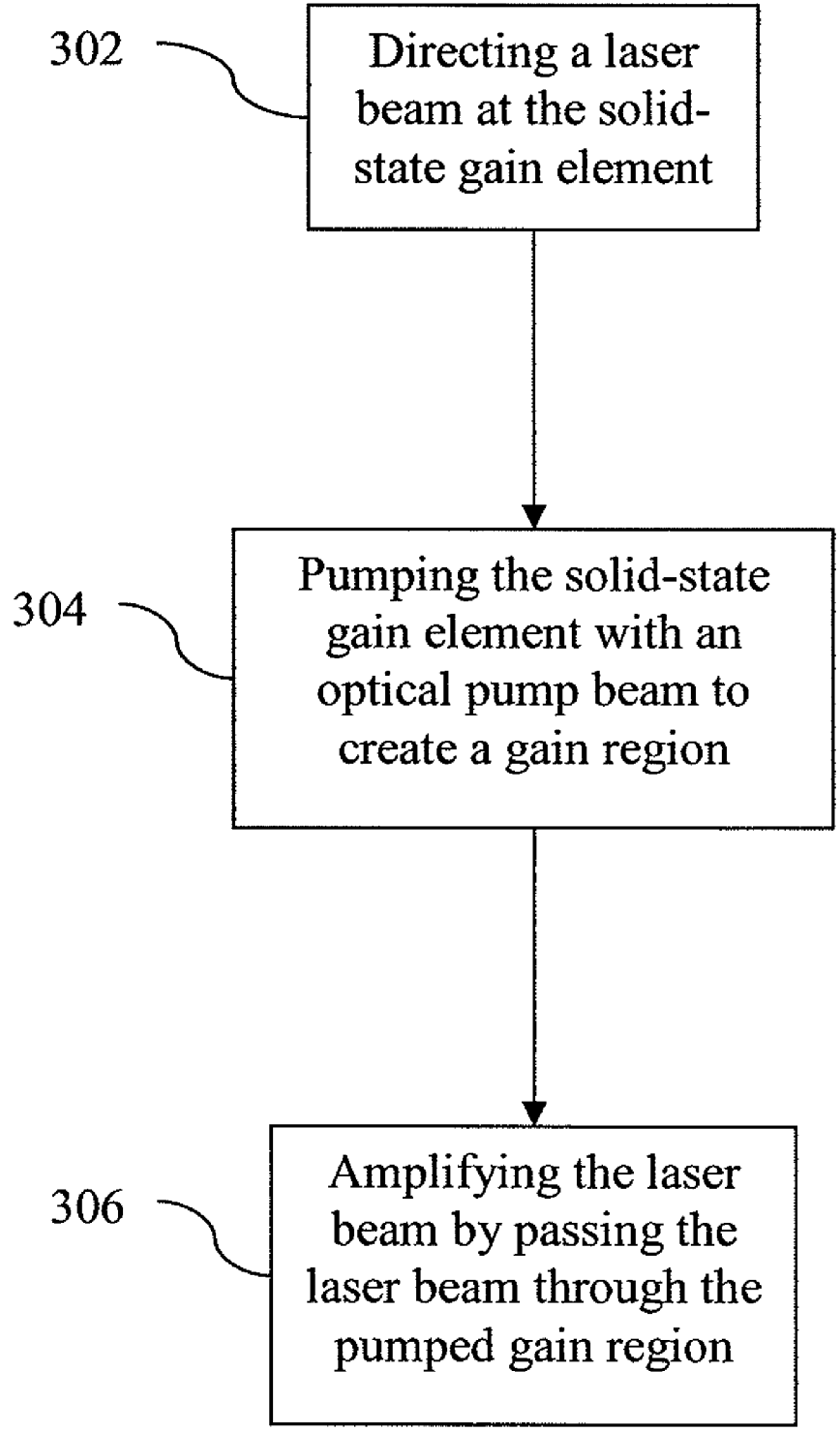
FIG. 3 is a flow chart illustrating one example of a method of amplifying a laser beam using a grazing-incidence slab gain element according to aspects of the invention.
Figure 4:
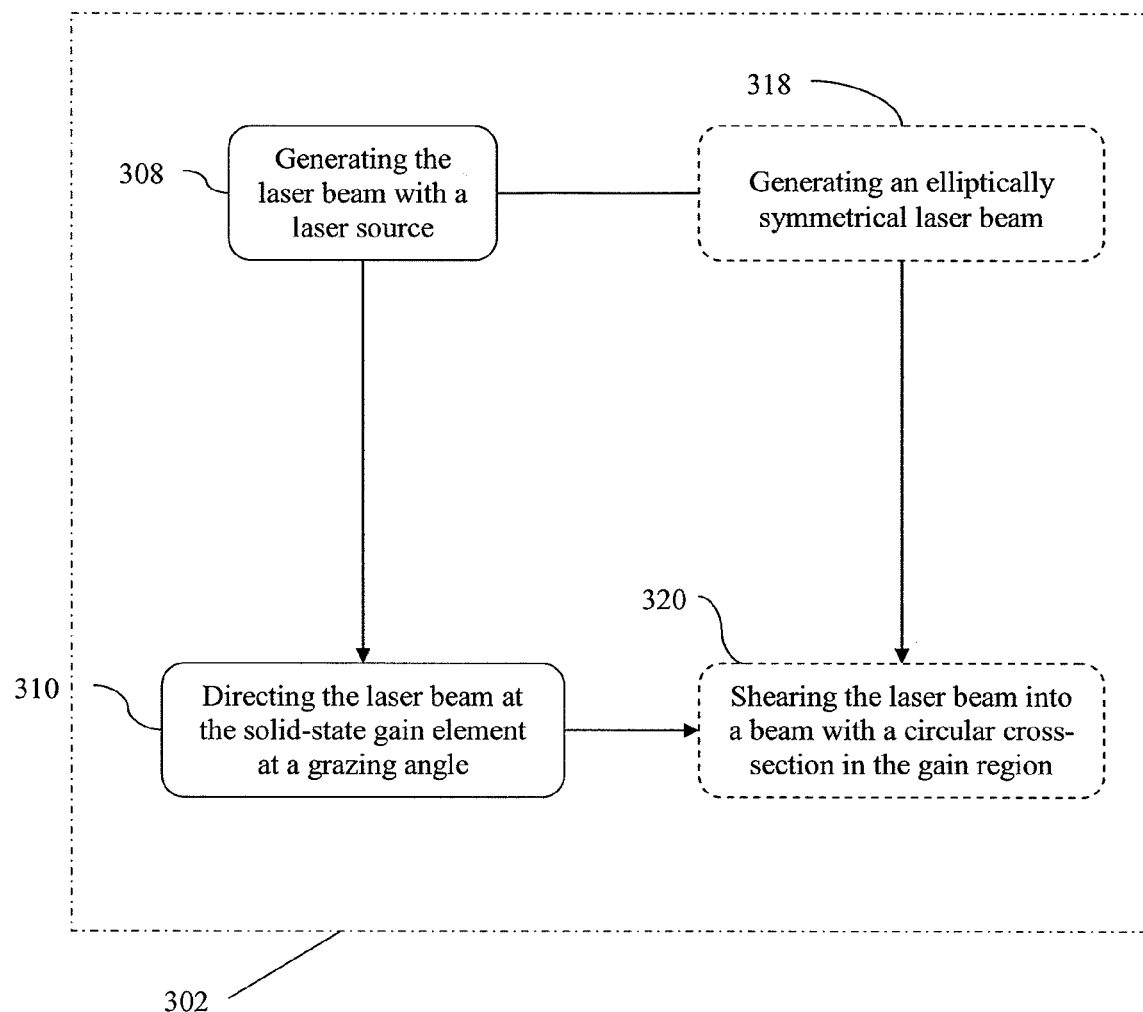
FIG. 4 is a flow diagram of one example of acts corresponding to step 302 in FIG. 3.

Referring to FIG. 3, in one embodiment, amplifying the optical signal 206 using the solid-state gain element comprises directing the optical signal at the gain element (step 302), pumping the gain element with an optical pump beam 212 to create the gain region (step 304), and amplifying the optical signal by passing the optical signal through the gain region (step 306). In one embodiment, directing the optical signal 206 at the gain element may include, for example, directing a laser beam at the gain element (step 302). Referring to FIG. 4, step 302 may include a step 308 of generating the laser beam with a laser source (see 216, FIG. 8). In one example, the optical signal 206 is incident on the thin doped region 204 at a near-grazing incidence (a few degrees out of plane of the thin doped region 204), as represented by step 310. In one embodiment, the source of the optical signal (e.g., source 216 in FIG. 8) may be positioned such that the optical signal 206 is incident on the surface of the solid-state gain element at the near-grazing angle, as illustrated in FIG. 2.

Figure 5:
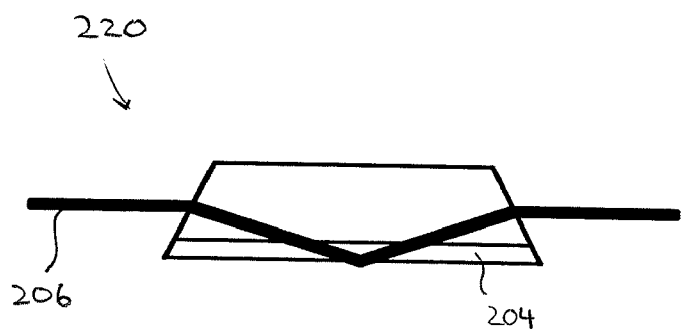
FIG. 5 is a diagram of another example of a grazing-incidence-slab geometry.

In another embodiment, any of the undoped cap 210, the thin doped region 204 and/or the heatsink 202 may refract the incident optical signal 206, such that the optical signal 206 passes through the gain region at an angle different than its initial angle of incidence. For example, referring to FIG. 5, there is illustrated an example of a configuration in which the laser beam path outside of the gain element 220 is parallel to the reflective surface. As illustrated in FIG. 5, the incident optical signal 206 is refracted such that it is incident on the thin doped region 204 at a near grazing incidence, and again refracted as it leaves the gain element to return to the parallel path. This configuration may be useful because the gain element 220 can be inserted into an optical path without causing any substantial angular deviation of the optical signal 206. In one example, a maximum angular deviation of the optical signal is approximately 2 degrees.

Figure 6:
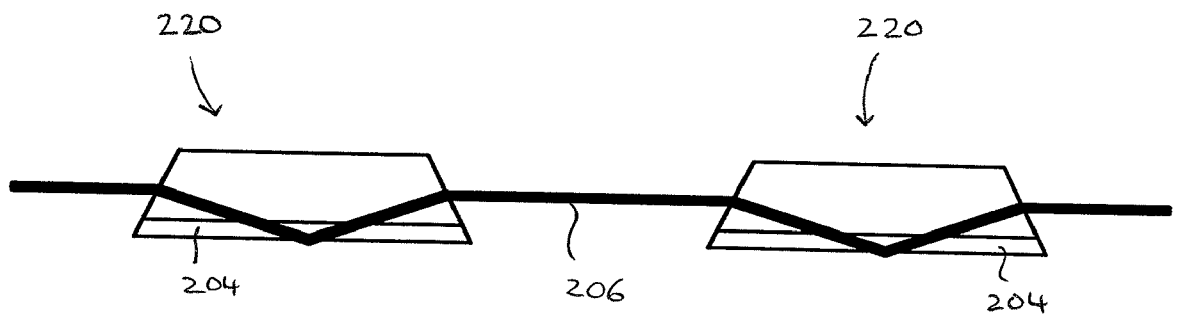
FIG. 6 is a diagram of another example of a grazing-incidence-slab geometry.

According to one embodiment, two or more gain elements can be optically coupled in series. For example, FIG. 6 illustrates a pair of gain elements 220 optically coupled in series. This configuration may be useful in making the optical alignment insensitive to vertical translational movement of the heatsink in examples where both gain elements 220 are mounted to a common heatsink or other mechanical reference. This is because deviation of the optical beam as it passes through one gain element may be compensated for by the subsequent gain element. In one embodiment, the gain elements 220 are used at cryogenic temperatures. In one example, the gain elements 220 are mounted to a common mechanical reference in a dewar. The dewar may shrink and expand due to temperature changes, particularly where the gain elements are used at cryogenic temperatures, leading to vertical movement of the mechanical reference. The effect of such vertical movement of the mechanical reference may be mitigated by the series configuration illustrated in FIG. 6.

Figure 7:
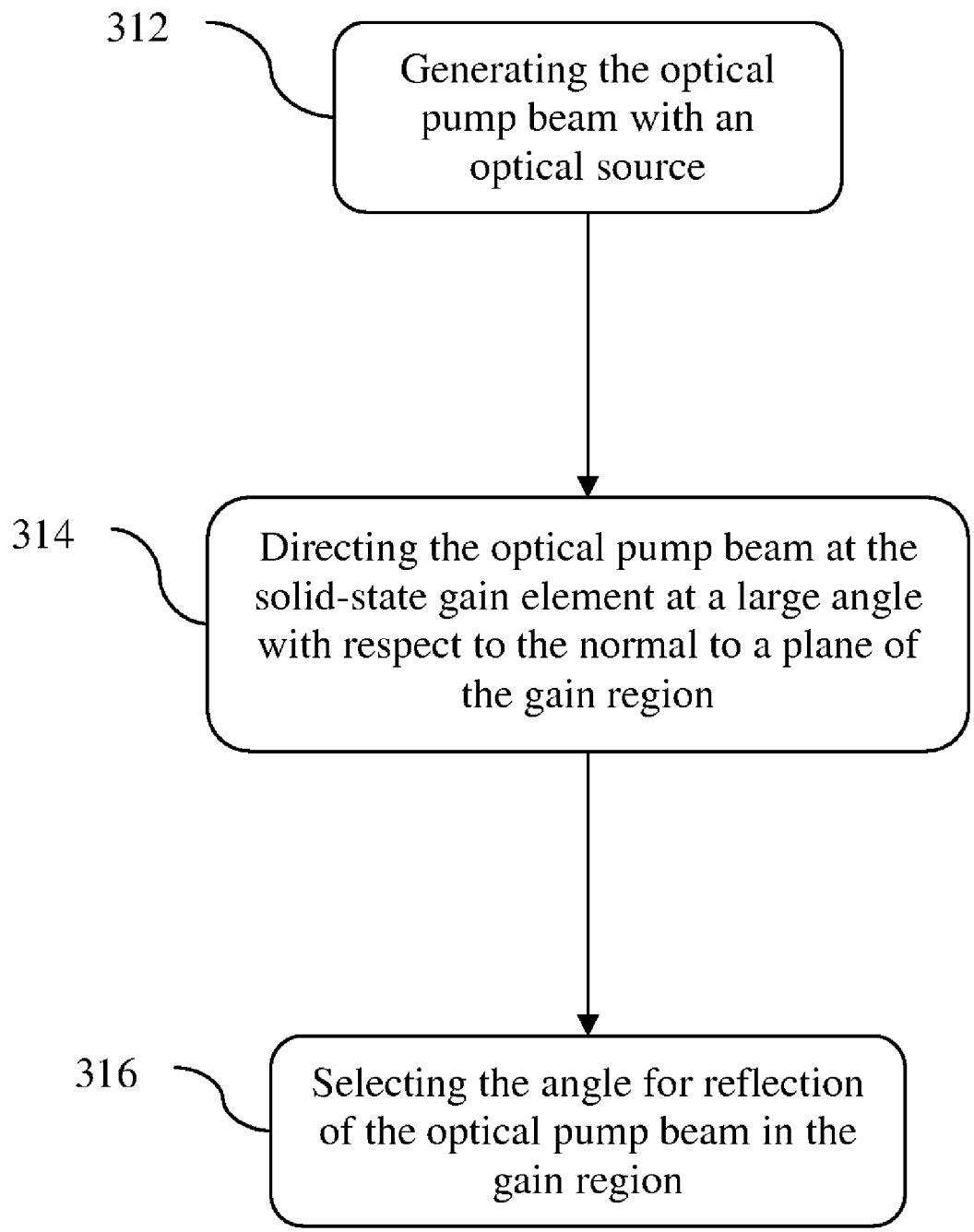
FIG. 7 is a flow diagram of one example of acts corresponding to step 304 of FIG. 3.
Figure 8:
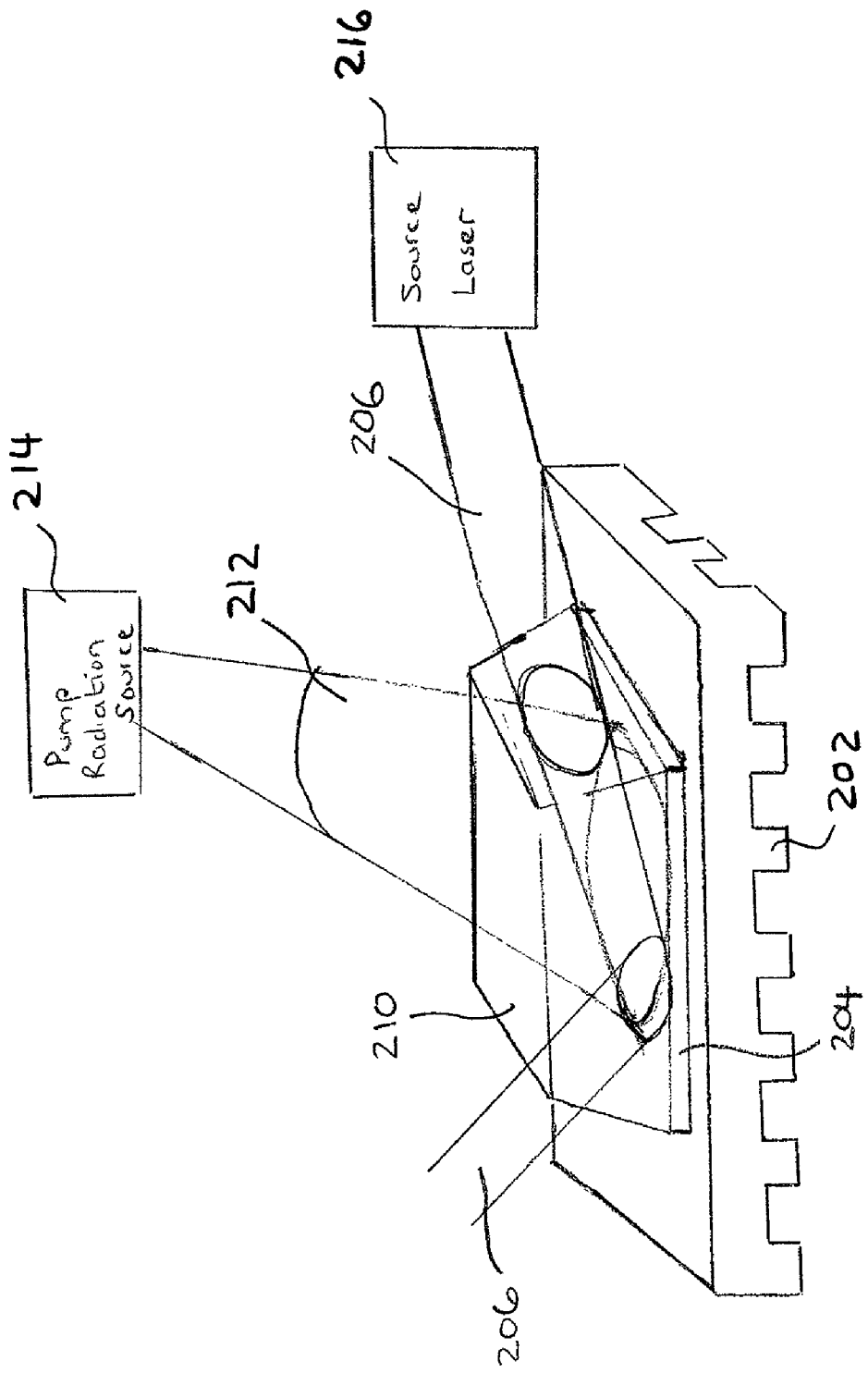
FIG. 8 is a diagram of another example a gain element having a grazing-incidence slab geometry, according to aspects of the invention.

Referring again to FIG. 3, as discussed above, according to one embodiment, the gain region in the thin doped region is created by pumping the thin doped region with an optical pump beam (step 304). Referring to FIGS. 7 and 8, in one example, the optical pump beam is generated (step 312) with a pump radiation source 214. The optical pump beam 212 is directed at the thin doped region 204 at a large angle with respect to the normal to the plane of the thin doped region (step 314), as illustrated in FIGS. 2 and 8. By directing the pump beam 212 at a large angle with respect to the normal, the path length of the pump radiation through the gain region 204 is increased. In one example, the pump beam 212 is directed at an angle in the range of about 45-89 degrees with respect to the normal. Furthermore, if the propagation angle is larger than the total internal reflection angle, the pump beam 212 will be reflected at the interface between the thin doped region 204 and the lower refractive index region 208, and the path length of the pump radiation through the gain region will be further increased by a factor of two (step 316). In another example, a second pass of the pump beam can be achieved by using a reflective coating on the back side of the thin doped region 204. Thus, the path length of the pump radiation through the thin doped region 204 may be doubled. By increasing the path length of the pump beam 212 through the thin doped region 204, the gain in the region may be increased due to the longer absorption path length. As a result, the thickness of the thin doped region may be reduced, and/or the gain element may use gain media having lower absorption coefficients.

For example, if the pump beam 212 is directed at 80 degrees off normal to the plane of the thin doped region 204, then the absorption path length is 5.8 times longer than the absorption path length for a pump beam directed at normal incidence, for the same thickness of the thin doped region. Including a second pass of the pump beam 212 through the gain region due to reflection, as discussed above, the absorption path length is 11.6 times longer than the path length for a single pump beam pass at normal incidence. In one example, there can be an inverse relationship between the absorption coefficient of the gain medium and the path length. Accordingly, by increasing the path length, the absorption coefficient may be reduced, allowing the solid-state gain element to use gain media with lower absorption coefficients. Some examples of material that may be used for the gain medium include, but are not limited to, Nd:YAG and Yb:YAG with a doping of a few percent.

The pump beam 212 may be directed at a many different angles, the particular angle in any example being selected based on, for example, the desired increase in path length, and/or the characteristics of the gain medium (which determine the angle of total internal reflection). The optical pump beam 212 may also be simultaneously directed into multiple surfaces of the gain element. In addition, the selected angle of incidence of the pump beam may affect the size of the gain element. For example, a larger angle of incidence of the pump beam may require a larger area for the thin doped region. Accordingly, a desired size of the gain element may affect the selection of the angle of incidence of the pump beam. Referring again to FIG. 2, in one example, the pump beam 212 is directed nominally co-linearly with the optical signal 206. One advantage of this configuration may be that it generally may be easier to get good overlap of the pump beam and the optical beam in the thin doped region. However, it may be more or less convenient from an overall design perspective to have the beams co-linear. Accordingly, referring to FIG. 8, in another example, the pump beam 212, generated by an pump radiation source 214, is directed at an angle with respect to the optical signal 206 (generated by laser source 216), rather than being co-linear with it. In this example, the pump beam 212 is still directed at a large angle with respect to the normal to the plane of the gain region 204. The pump beam 212 may have any of a variety of orientations relative to the optical signal 206, depending, for example, on the configuration of the system and the relative positioning of the pump radiation source 214 and the laser source 216.

According to another embodiment, the optical signal 206 has a controlled geometry so as to create a symmetric gain region in the gain element. This symmetric gain region may be used to reduce amplified spontaneous emission compared with conventional designs that use an asymmetric gain region, as discussed further below. Conventional grazing-incidence-disk gain elements use an asymmetric, generally elliptical or rectangular, gain region. This is because an optical signal (laser beam) with a conventional symmetric geometry (e.g., circular or square) entering the gain region of the grazing-incidence-disk element is sheared into an asymmetric (elliptical or rectangular, respectively) area in the gain region. If this asymmetric area is uniformly pumped, amplified spontaneous emission can preferentially build up along the major axis of the ellipse or rectangle.

Referring again to FIG. 4, according to one embodiment, this effect may be reduced by using an asymmetric (e.g., elliptical or rectangular) input laser beam (step 318) with an aspect ratio selected such that the beam will shear into a symmetric (e.g., circular or square, respectively) area in the gain region at grazing incidence (step 320). For a given area, the diameter of the resulting circle, or dimension of the resulting square, will be shorter than the corresponding major axis of the conventionally-formed ellipse or rectangle. This results in a shorter path along which amplified spontaneous emission can build up compared to conventional systems.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A grazing-incidence-disk optical system comprising:
    a heatsink;
    a thin doped region disposed on a first surface of the heatsink, the thin doped region having a front surface substantially parallel to the first surface;
    an undoped cap coupled to the thin doped region;
    a pump radiation source configured to generate an optical pump beam transmitted through the undoped cap and incident on the front surface of the thin doped region at a first non-zero angle relative to the normal to the thin doped region, the first non-zero angle being at least 45 degrees; and
    a symmetric gain region created by the optical pump beam in the thin doped region; and
    a laser source configured to generate a laser beam incident on the front surface of the thin doped region at a second non-zero angle relative to the normal to the thin doped region, the second non-zero angle being at least 45 degrees, wherein the laser beam has an aspect ratio selected such that the laser beam shears into a symmetric area in the gain region.

2. The optical system as claimed in claim 1, wherein the first non-zero angle is in a range of approximately 45 degrees to 89 degrees.

3. The grazing-incidence-disk optical system as claimed in claim 1, wherein the first and second non-zero angles are grazing angles.

4. The grazing-incidence-disk optical system as claimed in claim 1,
    wherein the symmetric area in the gain region is one of a circular area and a square area.

5. An optical system comprising:
    a laser source configured to generate a laser beam;
    a pump radiation source configured to generate an optical pump beam;
    a first solid-state gain element including:
        a heatsink;
        a thin doped region disposed on a first surface of the heatsink, the thin doped region having a front surface substantially parallel to the first surface; and
        a symmetric gain region created by the optical pump beam in the thin doped region;
    wherein the laser source is positioned relative to the first solid-state gain element and configured such that the laser beam is incident on the front surface of the thin doped region at a first grazing angle of less than 45 degrees relative to the plane of the front surface, the laser beam having an aspect ratio selected such that the laser beam shears into a symmetric area in the gain region; and
    wherein the pump radiation source is disposed relative to the first solid-state gain element and configured such that the optical pump beam is incident on the front surface of the thin doped region at a second grazing angle of less than 45 degrees relative to the plane of the front surface.

6. The optical system as claimed in claim 5, wherein the first solid-state gain element further comprises an undoped cap coupled to the thin doped region.

7. The optical system as claimed in claim 5, wherein the second grazing angle is selected to achieve total internal reflection of the optical pump beam at a boundary of the thin doped region.

8. The optical system as claimed in claim 5, wherein the laser source and the pump radiation source are arranged such that the laser beam and the optical pump beam are co-linear.

9. The optical system as claimed in claim 5, wherein the heatsink comprises a material with higher thermal conductivity than the thin doped region.

10. The optical system as claimed in claim 5, wherein the thin doped region comprises one of Nd:YAG and Yb:YAG.

11. The optical system as claimed in claim 5, wherein a path of the laser beam path outside of the first gain element is substantially parallel to the first surface.

12. The optical system as claimed in claim 11, further comprising a second solid-state gain element optically coupled in series with the first solid-state gain element with respect to the laser beam.

13. The optical system as claimed in claim 5, wherein the first solid-state gain element is operated at cryogenic temperatures.

14. The optical system as claimed in claim 5,
    wherein the symmetric area in the gain region is one of a circular area and a square area.

15. A method of amplifying an optical signal within an optically-pumped solid-state gain medium, the method comprising:
    creating a gain region in the solid-state gain medium by pumping the solid-state gain medium with an optical pump beam incident on a front surface of the solid-state gain medium at a first non-zero angle of at least 45 degrees relative to the normal to the front surface to produce optical gain within the solid-state gain medium;
    directing the optical signal at the solid-state gain medium at a grazing angle of at least 45 degrees relative to the normal to the front surface and co-linearly with the optical pump beam; and
    passing the optical signal through the gain region to amplify the optical signal.

16. The method as claimed in claim 15, wherein the front surface is a substantially flat surface, and wherein directing the optical signal at the solid-state gain medium includes:
    generating a laser beam with a laser source; and
    directing the laser beam to reflect internally from the substantially flat surface of the solid-state gain medium at the grazing angle.

17. The method as claimed in claim 15, wherein creating the gain region includes directing the optical pump beam at the front surface of the solid-state gain medium at an angle in a range of approximately 45-89 degrees relative to the normal to the front surface.

18. The method as claimed in claim 15, further comprising using the solid-state gain medium at cryogenic temperatures.

19. The method as claimed in claim 15, further comprising:
passing the optical signal through a gain region of a second solid-state gain medium optically coupled in series with the solid-state gain medium with respect to the optical signal.

20. The method as claimed in claim 19, wherein directing the optical signal at the solid-state gain medium includes:
directing the optical signal substantially parallel with the front surface; and
refracting the optical signal so that the optical signal is incident on the thin doped region at the grazing angle.

21. The method as claimed in claim 15, wherein creating a gain region further includes creating a symmetric gain region, and the method further including:
selecting an aspect ratio of the optical signal; and
shearing the optical signal into one of a circular area and a square area when passing through the gain region.

* * * * *